United States Patent Office 3,522,218
Patented July 28, 1970

3,522,218
CROSSLINKABLE ADDITION PRODUCTS PREPARED BY REACTING A MONOISOCYANATE WITH AN ORGANIC COMPOUND CONTAINING HYDROGEN ATOMS REACTIVE WITH NCO GROUPS
Josef Pedain, Cologne, Karl-Friedrich Zenner and Gunter Oertel, Cologne-Flittard, and Hans Holtschmidt, Leverkusen-Steinbuechel, Germany, assignors to Farbenfabriken Bayer Aktiengesellschaft, Leverkusen, Germany, a corporation of Germany
No Drawing. Filed Dec. 1, 1967, Ser. No. 687,144
Claims priority, application Germany, Dec. 6, 1966,
F 50,855, F 50,856
Int. Cl. C08g 22/06
U.S. Cl. 260—77.5                                9 Claims

ABSTRACT OF THE DISCLOSURE

Crosslinkable polyaddition products are the reaction product of an organic compound containing active hydrogen atoms which are reactive with NCO groups and a monoisocyanate having the formula

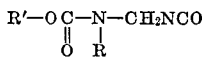

where R is alkyl, alkenyl, cycloalkyl, aralkyl or chloraralkyl having 1 to 12 carbon atoms and R' is the same as R and also chloralkyl having 1 to 12 carbon atoms, aryl and chloraryl having 6 to 12 carbon atoms.

These products crosslink upon heating or by catalysis to solid elastic lacquers or sealing compounds.

CROSSLINKABLE ADDITION PRODUCTS

This invention relates to crosslinkable addition products and to a method of preparing the same. More particularly, it relates to addition products prepared from a particular monoisocyanate.

It is an object of this invention to provide a crosslinkable addition product. It is another object of this invention to provide a method of manufacturing crosslinkable addition products. It is still another object of this invention to provide non-porous products which are formed by heating or catalyzing crosslinkable addition products.

The foregoing objects and others that will become apparent from the following description in accordance with the invention generally speaking by providing crosslinkable polyaddition products that are the reaction product of an organic compound having active hydrogen atoms that are reactive with —NCO groups and a monoisocyanate having the formula

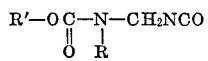

where R is alkyl, alkenyl, cycloalkyl, aralkyl or chloralkyl having 1 to 12 carbon atoms and R' is the same as R and also chloralkyl having 1 to 12 carbon atoms, aryl and chloraryl having 6 to 12 carbon atoms.

In accordance with the invention the crosslinkable addition products are prepared by reacting an organic compound containing active hydrogen atoms that are reactive with —NCO groups, which active hydrogen atoms exhibit a positive indication in accordance with the Zerewitinoff test, with an organic monoisocyanate as described above.

It is possible by virtue of the process according to the invention to convert each Zerewitinoff-active hydrogen atom, in the organic compound containing active hydrogen atoms used as starting materials, by a simple addition reaction, into a group having the formula

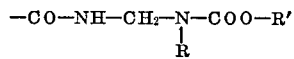

in which R and R' havethe meanings above. For example, free hydroxyl groups in high molecular weight compounds are converted by the action of isocyanates corresponding to the above general formula into urethane groups in accordance with the following equation:

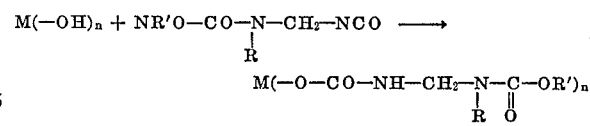

wherein M represents the residue remaining after removal of the hydroxyl groups from a polyhydric alcohol; $n$ represents an integer equal to the valence of M; and R and R' have the meanings given above.

For example, in a reaction between tripropylene glycol and N - methyl - N-methoxycarbonylaminomethyl isocyanate the equation is as follows:

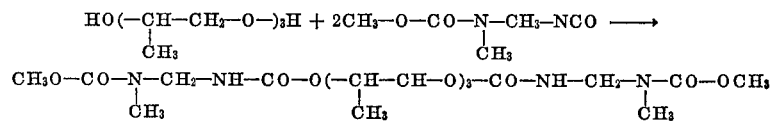

As formulated by way of example in the following equations, primary or secondary amino groups or amido groups present in high molecular weight compounds may be similarly converted into urea group; primary or secondary hydrazino or hydrazido groups may be converted into semicarbazide groups and active methylene groups and carboxyl groups may be converted into carbamide groups (with carboxyl groups, conversion is accompanied by the evolution of $CO_2$).

The Zerewitinoff-active groups may be terminal groups or chain members of the high molecular weight compounds or members of a side chain. Examples of such functional groups and their conversion into

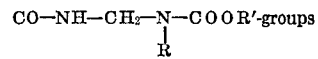

are diagrammatically illustrated by the following equations:

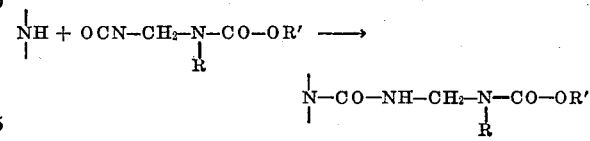

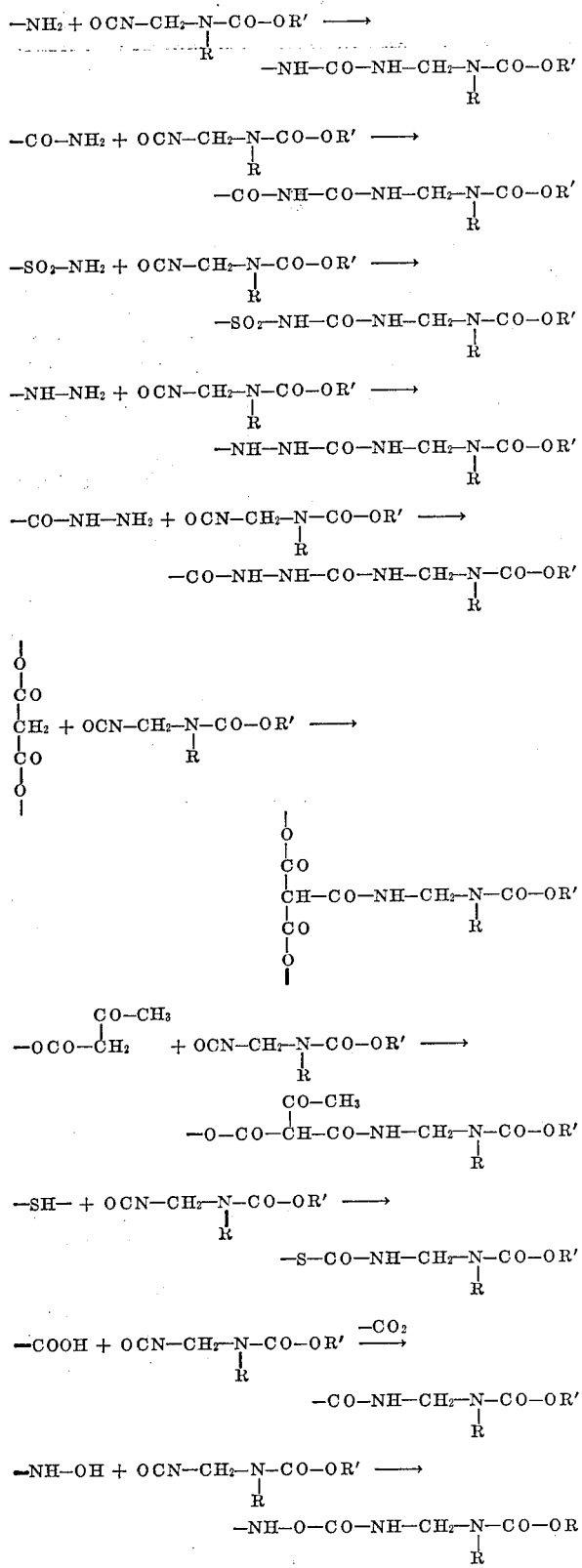

It is possible by virtue of the process according to the invention to react any kind of compounds containing Zerewitinoff-active hydrogen atoms and, in particular, high-functional and highly sensitive polymerization, polycondensation and polyaddition products, in a controlled reaction under moderate conditions, to form crosslinkable plastics or plastics intermediates. One particular advantage of the process according to the invention is that the reactions can be carried out in entirely salt-free inert media and in the absence of any kind of harmful catalyst.

Another advantage of the process according to the invention is that selective reactions can be carried out with high molecular weight compounds which contain several different kinds of Zerewitinoff-active hydrogen atoms, for example in amido, hydroxyl or amino groups. For example amino groups can be reacted in preference to hydroxyl groups and amido groups because of their higher reactivity with respect to the isocyanates used in accordance with the invention.

It has also been found that the modified compounds obtained by the process according to the invention can be converted into an insoluble, crosslinked state by heating them at a temperature from 50 to 250° C. and/or by the action of an acid catalyst, such as trichloroacetic acid, trichloroacetic acid chloride, p-toluene sulphonic acid, benzene sulphonyl-chloride, phosphoric acid, hydrochloric acid, hydrogen chloride, sulphuric acid, chlorosulphonic acid, sulphonated polymers based on polystyrene, optionally cross-linked with polyvinyl compounds or phenol-formaldehyde condensates, and phosphorus trichloride, as well as Lewis acids such as boron trifluoride (also in the form of their adducts, for example with ether or acetic acid), aluminum chloride, ferric chloride, zinc chloride, antimony (V)-chloride, and stannic chloride. The acid catalyst may be used in quantity from 0.01 to 10% by weight, based on the reaction product. Accordingly, the process according to the invention enables any compound containing active hydrogen atoms which, on its own, is not spontaneously crosslinkable, to be converted into a crosslinkable plastic or plastics intermediates by means of a reaction with the isocyanates of the formula given above, If, for example, the liquid reaction product of tripropylene glycol and N-methyl-N-methoxycarbonylaminomethylisocyanate described above, is mixed with 1% by weight of phosphoric acid, and the resutling mixture is applied to metal plates and heated for 30 minutes at 150° C., high-gloss elastic lacquer films are obtained which are insoluble in all the usual solvents.

Any organic compound containing active hydrogen atoms that are reactive with —NCO groups may be used as starting materials for the process according to the invention providing it contains Zerewitinoff-active hydrogen, such as, for example, polyhydric alcohols, polyamines, aminoalcohols, high molecular weight products such as polyesters, polyethers, polythioethers, polyacetals, polyamides or polyepoxide resins with hydroxyl groups in the molecule; phenol-formaldehyde resins; aminoplasts and their modification products with polyfunctional alcohols; aniline-formaldehyde resins; polyazomethines; polyurethanes; polyureas and polythioureas; polysulphonamides; melamine derivatives, cellulose derivatives and the like; such as polyhydric alcohols, such as ethane diol, 1,2-propane diol, 1,3-propane diol, 1,4-butane diol, 1,3-butane diol, 1,5-pentane diol, 1,6-hexane diol, 1,8-octane diol, 1,12-dodecane diol, 2,2-dimethyl-1,3-propane diol, glycerol, trimethylolpropane, 1,2,6-hexane triol, pentaerythritol, mannitol, sorbitol; polyether alcohols such as di-, tri-, tetra-, or octa-ethylene- and -propylene glycols or the reaction products of glycerol, trimethylol propane, hexane triol, sorbitol or mannitol with ethylene oxide or propylene oxide, hydroxyalkylated phenols such as di-($\beta$-hydroxyethyl)-hydroquinone or 2,2-bis-(4-$\beta$-hydroxyethoxyphenol)-propane; polyalcohols containing amino groups such as N-methyl-diethanolamine, triethanolamine, tri-(2-hydroxypropyl)-amine or N,N,N'N'-tetra-(2-hydroxypropyl)-ethylene diamine; carboxylic acid esters and amides containing hydroxy groups such as monoacetyl glycerol, maleic acid-di-($\beta$-hydroxyethyl) - ester, succinic acid-di-(4-hydroxybutyl)-ester, adipic acid-di-($\beta$ - hydroxyethyl) - ester, phthalic acid-di-($\beta$-hydroxyethyl)-ester, acetic acid-di-(N,N-$\beta$-hydroxyethyl)-amide, phthalic acid-di-(N-methyl - N - $\beta$ - hydroxyethyl) - amide or adipic acid - tetra- (N,N,N'N'-β-hydroxy-ethyl)-amide; and hydroxyl-containing esters and amides of acids of phosphorus and sulphur such as tris-(6-hydroxyhexyl)-phosphite, phosphoric acid diethyl ester (-di-N,N-β-hydroxyethyl)-amide, methanephosphonic acid-di - (4-hydroxybutyl)-ester, methane-sulphonic acid-di-(N,N-β-hydroxyethyl)-amide and the like; polyamines such as, for example, 1,3-propylene diamine, 1,4-butylene diamine, 1,6-hexylene diamine, 1,2,6-hexane triamine, 2,4-tolylene diamine, 4,4'-diamino diphenylmethane, cyclohexylene diamine, 1,3,5-cyclohexylene triamine, 1,4-phenylene diamine, 1,5-naphthalene diamine, 4,4',4'',4'''-tetra (amino phenyl) methane and the like; amino alcohols such as, for example, amino ethyl alcohol, amino propyl alcohol, amino butyl alcohol, amino hexyl alcohol, amino cyclohexyl alcohol and the like; polyesters of polycarboxylic acids, such as adipic acid, succinic acid, maleic acid, phthalic acid, isophthalic acid, terephthalic acid, tetrachlorophthalic acid, hexahydrophthalic acid, hexachloroendomethylenetetrahydrophthalic acid, trimellitic acid and pyromellitic acid with polyalcohols such as ethylene glycol, butane diols, hexane diols, 2,2-dimethyl-1,3-propane diol, diethylene glycol, di-(β-hydroxyethyl)-butane diol, tripropylene glycol, xylylene glycol, glycerol, trimethylol propane, pentaerythritol, mannitol, and their hydroxyalkylation products; polyesters of hydroxypivalic acid, thioglycolic acid, w-hydroxydecanic acid, caprolactone and diketene; polyesters of the aforementioned dicarboxylic acids and polyphenols such as hydroquinone, 4,4'-dihydroxy - diphenyl or bis-(-4 - hydroxyphenyl) - sulphone; polyesters modified with fatty acids (oil alkyds) and naturally occurring saturated or unsaturated polyesters, their degradation products or reaction products with polyols such as caster oil, tall oil, soyabean oil or linseed oil; polyesters of carbonic acid obtainable in known manner from hydroquinone, diphenylol propane, p-xylylene glycol, ethylene glycol, butane diol or hexane-1,6-diol and other diols, by conventional condensation reactions, for example with phosgene or diethyl or diphenylcarbonate, or from cyclic carbonates such as glycol carbonate or vinylidene carbonate, by polymerization; polyesters containing silicon for example obtained from dimethyldichlorosilane and polyfunctional alcohols or phenols of the aforementioned kind; polyesters of phosphonic acids, for example obtained from methane-, ethane-, β-chloroethane, benzene or styrene phosphonic acids; phosphonic acid chloride or phosphonic acid esters and polyalcohols or polyphenols of the aforementioned kind; polyesters of phosphorous acid, for example obtained from phosphorous acid, phosphorous acid esters, ester amides or ester chlorides and polyalcohols, polyether alcohols or polyphenols; polyesters of phosphoric acid, for example obtained from polyesters of phosphorous acid by oxidizing or transesterifying phosphoric acid esters with polyalcohols or polyphenols; polyethers of boric acid; and polysiloxanes, for example the products obtained by the hydrolysis of dialkyldichlorosilanes with water, followed by treatment with polyalcohols or the products obtained by the addition of polysiloxane dihydrides with olefins such as allyl alcohol or acrylic acid; polyesters of alkylene oxides such as ethylene oxide, propylene oxide, 2,3-butylene oxide, epichlorohydrin and the bis(2,3-epoxy-propylether) of diphenylol propane; polyethers of trimethylene oxide, 3,3-bis-(chloromethyl)-oxacyclobutane or tetrahydrofuran; polyethers of hexane diol, pentamethylene glycol, decamethylene glycol and of hydroxyalkylated phenols such as O,O-di-(β-hydroxyethyl)-resorcinol; polyether-polythioethers, particularly those obtained from thiodiglycol; basic polyethers, for example those obtained from di-(β-hydroxypropyl)-methylamine, di-(β - hydroxyethyl)cyclohexylamine, di - (-β-hydroxyethyl)-aniline and di-(β-hydroxyethyl)-m-toluidine; and polyethioethers, for example the reaction products known as thioplasts obtained from aliphatic dihalogen compounds such as 1,2-dichloroethane, bis-(2-chloroethyl)-ether or bis-(2-chloroethyl)-formal, which contain mercaptan groups, as well as their oxalkylation products; polyamines, for example polyethylene imines, their cyanoethylation and hydroxyalkylation products, in particular the reaction products of polyalkylene-polyamines with epichlorohydrin; the hydrogenation products of polyamines, for example polyethylene imines, their cyanoethylation and hydroxyalkylation products, in particular the reaction products of polyalkylene amines with epichlorohydrin, the hydrogenation products of cyanoalkylated high molecular weight polyamines and polyalcohols, as well as polyether alcohols or polyesters; polyacetals; of formaldehyde and diols such as butane diol or hexane diol; polyoxymethylenes, for example copolymers of formaldehyde or trioxane with 1,3-dioxolan, 1,3-oxthiolan or ethylene oxide; naturally occurring acetals such as crude sugar, invert sugar, starch, dextrin, cellulose and their alkylation, acylation, transesterification and degradation products; spirocyclic polyacetals obtained from pentaerythritol and glyoxal; polymercaptals, in particular those obtained from formaldehyde and 1,4-tetramethylene dimercaptan or 1,6-hexamethylene dimercaptan; polyamides of diamines such as diaminodiphenyl methane and diaminodiphenyl propane, m-xylylene diamine, ethylene diamine, tetramethylene diamine or hexamethylene diamine and polycarboxylic acids of the kind mentioned above in connection with polyesters, dimeric fatty acids and mineral acids of the phosphoric acid, phosphorous acid and phosphonic acid type; polypeptides of natural or synthetic amino acids, such as glycine, alanine, 4-aminobutyric acid, 6-aminocaproic acid or 17-aminoheptadecanic acid; polyamides obtained from lactams, 6-caprolactam in particular; naturally occurring polypeptides and their degradation products, for example gelatins or casein; further, polyimides and polybenzimidazoles containing terminal amino groups, such as polyimides obtained from pyromellitic acid anhydride and diamines, and the known modification products of polyphosphornitrile-chlorides with polyamines, aminoalcohols or polyalcohols; polyesteramides abtained from the aforementioned carboxylic acids; polyalcohols and polyamines or polycarboxylic acids and aminoalcohols such as ethanolamine, 4-amino-1-butanol, 6-amino-1-hexanol, diethanolamine or aminophenols; the condensation products of dicarboxylic acids and hydrazine, known as polyhydrazides; the methylene polyamides obtained from dinitriles and formaldehydes; the polysulphonamides, for example those obtained from n-hexane-1,6-bis-sulphonic acid chloride or m-benzene-bis-sulphonic acid chloride and 1,6-hexamethylene diamine; polyazomethines, for example those obtained from terephthaldialdehyde and ethylene diamine, hexamethylene diamine, tetrachloro-p-phenylene diamine, 4,4' - diaminodiphenylether, or 4,4' - diaminodiphenylmethane; polyepoxide resins, for example the relatively high molecular weight resins containing secondary hydroxy groups based on the bis-(2,3-epoxypropyl)-ether of 1,4-butane diol or diphenylol propane, bis-(2,3-epoxypropyl)-aniline and N,N'-bis-(2,3-epoxypropyl)-N,N'-dimethyl-4,4'-diaminodiphenylmethane and their modification products with polyisocyanates, unsaturated carboxylic acids or natural resin acids or with phenol-, melamine- and urea-formaldehyde resins; phenol-formaldehyde resins, for example those obtainable from phenols, cresols, xylenols, resorcinol or diphenylolalkanes by the usual methods, for example by acid or alkaline condensation, particularly in the presence of excess formaldehyde, and their cyanoethylation and hydrogenation products; aminoplast resins, for example those based on urea, thiourea, melamine, dicyandiamide, adipic acid diamide, hexamethylene diurea, ethylene urea, acetylene urea or m-benzene disulphonamide and their modification products with polyols; aniline-formaldehyde resins and ketone resins, for example condensation products of cyclohexanone and formaldehyde; polyureas, for example those obtained from hexamethylene diamine or bis-(γ-aminopropyl)-ether by condensation with carbon dioxide, urea or diphenyl carbonate, from 1,10-decamethylene diamine by condensation with 1,6-hexamethylene-bis-ethylurethane or by polyaddition of diamines such as 4,4′-diaminodiphenylmethane, 4,4′-diaminodiphenyl, 1,8-octamethylene diamine, sodium 2,6-diaminotoluene-4-sulphonate with or to polyisocyanates such as 1,6-hexamethylene diisocyanate, 2,4-tolylene diisocyanate or 4,4′-diisocyanato diphenyl methane; polythioureas, for example those obtained from hexamethylene diamine or p-xylylene diamine by condensation with carbon disulphide or trithiocarboxylic acid esters or by the polyaddition of diamines with diisothiocyanates, for example hexamethylene diisothiocyanate; polyurethanes, for example those obtained from low molecular weight mono- or polyhydric alcohols, such as ethylene glycol, propylene glycol, butane diol, hexane diol, diethylene glycol, triethylene glycol, thiodiglycol, N,N-di-(β-hydroxyethyl)-aniline or m-toluidine, N-methyl-diethanolamine, hydroquinone-di-(β-hydroxyethyl)-ether, adipic acid-di-(β-hydroxyethyl)-ester, N,N,N′,N′, - tetra-(2-hydroxypropyl)-ethylene diamine, glycerol, trimethylol propane, mannitol or glucose, and polyisocyanates such as hexamethylene diisocyanate, tetramethylene diisocyanate, tolylene diisocyanate, p-phenylene diisocyanate, 4,4′-diisocyanato diphenylmethane, 1,5-naphthylene diisocyanate, 4,4′,4″-triphenylmethane triisocyanate or 4,4′,4″-triisocyanato triphenylthiophosphate; from high molecular weight polyhydroxyl compounds such as saturated or unsaturated polyesters, polyethers, polyacetals polythioethers or polyesteramides of the aforementioned kind containing hydroxyl groups and, optionally carboxyl groups as well and polyisocyanates or masked polyisocyanates in the presence of conventional low molecular weight chain extenders, such as water, glycols, hydrazines, hydrazides, diamines and aminoalcohols, or from bis-chloroformic acid esters such as ethylene glycol-bis-chloroformic acid ester or butane-1,4-diol-bis-chloroformic acid ester by condensation with di- or polyamines, such as ethylene diamine, hexamethylene diamine, bis - (3 - aminopropyl) ether, piperazine, 1,4-diamino-cyclohexane bis-(4-amino-3-methylphenyl)-methane, p-phenylene diamine or diethylene triamine; suitable polymerization products including all polymers containing Zerewitinoff-active hydrogen atoms, for example homo- or copolymers of the following compounds; acrylic acid-β-hydroxyethylester, acrylic acid-β-hydroxy-propylester, α-chloroacrylic acid-β-hydroxypropyl ester, α-phenyl-acrylic acid-β-hydroxypropyl ester, α-ethyl-acrylic acid-2-hydroxy-3-phenoxypropyl ester, methacrylic acid-2-hydroxy-3-chloropropyl ester, methacrylic acid-4-hydroxyphenyl ester, methacrylic acid-6-hydroxyhexyl ester, 4-hydroxymethyl styrene, methacrylic acid-2-aminoethyl ester, methacrylic acid-2-hydroxyethylamide, methacrylic acid-N-di-(β-hydroxyethyl)-amide, acrylic acid-4-hydroxyphenylamide, acrylic acid-4-hydroxybutylamide, vinyl-2-hydroxyethyl-ether, 4-(2-hydroxyethyl)-styrene allyl alcohol, methacrylic acid trimethylol methylamide, maleic acid-di-2-hydroxyethyl ester, maleic acid-2-hydroxyethyl ester, maleic acid-2-hydroxyethyl ester, acrylic acid-3-di-(β-hydroxyethyl)-aminopropylamide, methacrylamide, acrylamide, acrylic acid hydrazide, N-hydroxy-methacrylamide, acrylic acid, methacrylic acid, vinyl-sulphonic acid, vinyl sulphonamide and the like.

Preferred starting materials, however, are copolymers of 0.5 to 25% and preferably 5 to 10% of the aforementioned monomers reactive with respect to isocyanates, with one or more of the following polymerizable compounds: methyl, ethyl, butyl acrylate; methyl, ethyl, butyl or allyl methacrylate; styrene; α-methylstyrene; chlorinated styrenes; vinyl acetate; vinyl butyrate; vinyl chloride; vinylidene chloride; vinyl butyl ether; vinyl-pyridine; N-vinylpyrrolidone; N-vinyl-oxazolidone; N-vinyl ureas; N-vinyl urethanes; ethylene; propylene; butadiene; isoprene; dimethylbutadiene; chloroprene and glycol diacrylates.

Polymers in which groups functional with respect to isocyanates are produced by subsequent treatment, for example by a graft reaction, or by hydrolysis, are also mentioned as examples. Polymers thus prepared as used in accordance with the invention are for example polyvinyl alcohol, hydrolyzed polyvinyl acetate, hydrolyzed polyvinyl acetate polyethylene copolymers, hydrolyzed polyacrylates, hydrolyzed polyvinylidene carbonates, hydrogenation products of ethylene/carbon monoxide copolymers, graft polymers of vinyl compounds such as vinyl chloride, vinyl acetate or acrylonitrile on linear or branched polyethers, polyacetals or on polymers of the aforementioned kind containing groups functional with respect to isocyanates.

The starting materials used in accordance with the invention may be monomeric or polymeric linear or branched and may have a molecular weight from 60 to 500,000.

Any suitable isocyanate having the general formula

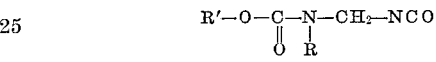

in which R and R′ have the meanings given above may be used for the reaction with the active hydrogen containing compound. They can be obtained by the process described in copending U.S. application Ser. No. 684,638, which comprises reacting an alkali metal or alkaline earth metal cyanate with a compound having the formula

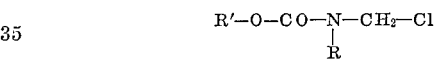

in which R and R′ have the meanings given above, in an inert organic solvent or mixture of such solvents, at a temperature in the range from 30 to 230° C.

The method of preparation is described by way of example with reference to N-methyl-N-methoxycarbonyl-aminomethyl isocyanate. Parts are by weight unless stated otherwise. About 176 parts of N-methyl-N-chloromethylcarbamic acid methyl ester are added to a suspension of about 150 parts of sodium cyanate in about 400 parts by volume of acetonitrile. The mixture is refluxed while stirring until all the chlorine in the N-methyl-N-chloromethylcarbamic acid ester is reacted (which takes about 2 hours). After the inorganic salts have been filtered off, the solvent is removed by distillation at normal pressure or at reduced pressure using a small column. Vacuum distillation of the residue yields about 131 parts (71% of the theoretical) of N-methyl-N isocyanate-methylcarbamic acid methyl ester, B.P. 92° C./11 torr, $n_D^{20}$ 1.443, NCO content 29.1% (calculated 29.2%).

Any suitable iscyanate having the formula set forth above may be used such as, for example,

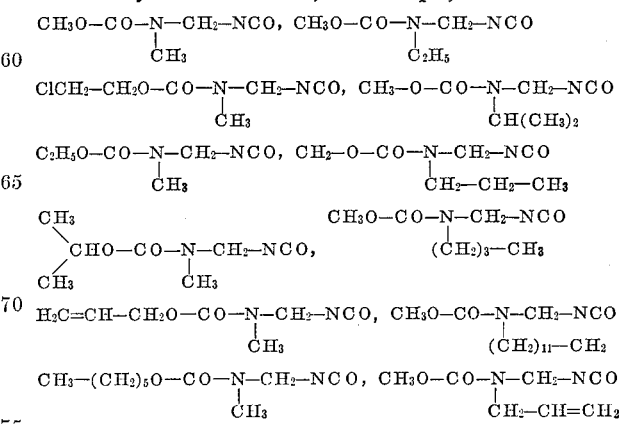

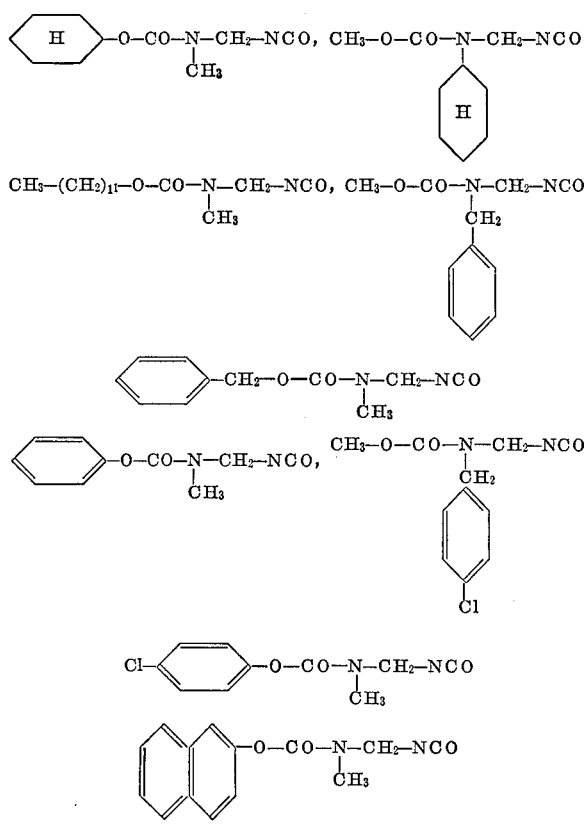

and the like.

The reaction conditions under which the organic compound containing active hydrogen atoms is reacted with the isocyanates of the above general formula, can be varied, depending upon the choice of possible starting materials and of their physical and chemical properties. The reaction can be carried out at a temperature from −50 to +250° C., preferably from −20 to +150° C., in the melt, solution, suspension or in emulsion. Generally speaking, compounds which are inert with respect to isocyanates, such as hydrocarbons, chlorinated hydrocarbons, ethers, esters, ketones, dialkylcarbonamides, sulphones, sulphoxides or nitriles, may be used as the solvents or diluents. If, however, the compound to be reacted with the isocyanate contains basic primary or secondary amino or hydrazino groups as the Zerewitinoff-active groups, the reaction may even be carried out in solvents or diluents containing hydroxyl groups, such as alcohols or water because in this case the isocyanate reacts selectively with the more reactive amino groups.

The isocyanate may either be initially introduced in solution or in the melt and the active hydrogen compound added to it in the melt, solution, emulsion or suspension, or the isocyanate may be added to the active hydrogen compound. The N-alkyl-N-alkoxycarbonyl-aminomethyl- or N - alkyl - N-arlyoxycarbonlyamino-methylisocyanate may be used either in stoichiometric quantities or in an excess or deficit, based on the Zerewitinoff-active hydrogen atoms present, depending upon the type of end product required. Any excess of isocyanate can readily be removed on completion of the reaction by heating the end products or product solutions, preferably at reduced pressure.

In one particular embodiment of the process according to the invention, an active hydrogen compound having a molecular weight of from 600 to 100,000 is reacted with an excess of N-alkyl-N-alkoxy- or -aryloxycarbonyl-aminomethyl isocyanate, based on the active hydrogen atoms present, and the excess isocyanate is converted into low molecular weight urethanes or ureas in the reaction mixture by the addition of polyamines or polyalcohols. The low molecular weight urethanes or ureas are left behind in the reaction product and enable the degree of crosslinking to be varied when the product is subsequently crosslinked.

In most instances, the reaction proceeds satisfactorily, even in the absence of catalysts. If desired, however, the activators commonly used for isocyanate reactions such as tertiary amines, tin compounds and metal salts may be added.

The products obtained by the process according to the invention are valuable crosslinkable plastics or plastics intermediates. They can be formed by conventional methods and then crosslinked in a suitable fashion, for example by heating and/or by the action of an acid catalyst. The products are also suitable for use as textile and leather auxiliaries, and as starting materials for surface-active compounds.

Depending upon the type of starting materials, and particularly the organic compound containing active hydrogen atoms, the addition products obtained in accordance with this invention are oily, wax-like, crystalline, plastic or plastic intermediate products. They can be formed by conventional methods and then crosslinked by heating or by the addition of acid catalysts to produce the final desired article. The addition products prepared from low molecular weight active hydrogen containing compounds, i.e., those having a molecular weight less than 600, upon crosslinking produce lacquers and pourable sealing compounds. The addition products prepared from the higher molecular weight active hydrogen containing compounds are suitable in all types of applications such as injection molding, calendering, extruding and the like, and find particular use as textile and leather auxiliaries and as starting materials for surface active compounds. The addition products in accordance with this invention may be used in their pure form or may be mixed with conventional fillers, pigments and the like such as carbon black, kieselguhr, sawdust, titanium dioxide and iron oxide.

The invention will be further illustrated by the following examples in which parts are by weight unless otherwise specified.

EXAMPLE 1

About 329 parts by weight of N-methyl-N-methoxycarbonyl-aminomethyl isocyanate are added dropwise at about 50 to about 60° C. to about 224 parts of tripropylene glycol. The resulting mixture is kept at this temperature for a period of four hours. The adduct is then obtained in the form of a colorless liquid which is highly viscous at room temperature.

If this substance is ground with about 1% of phosphoric acid, about 30% of titanium dioxide and about 20% of butyl acetate, a lacquer paste is obtained which has satisfactory spreading or coating properties and a pot life of several months. Coatings on glass or metal stoved for about 30 minutes at about 120° C. show outstanding elasticity and hardness, a high resistance to solvents and a high gloss.

EXAMPLE 2

About 50 parts of a hydroxyl-containing polyether of trimethylol propane and propylene oxide with an OH number of 580 and an average molecular weight of approximately 300, are reacted with about 60 parts of N-methyl-N-methoxycarbonylaminomethyl isocyanate in a manner similar to Example 1. The adduct is obtained in the form of a clear, pale yellow syrupy mass.

EXAMPLE 3

In a manner similar to that described in Example 1, an adduct in the form of a highly viscous oil is obtained from about 60 parts of N-methyl-N-methoxycarbonyl-aminomethyl isocyanate and about 67 parts of a polyhydroxyl compound with an average molecular weight of 500 and a percentage OH content of 11.5 prepared by oxyalkylating trimethylol propane with propylene oxide.

With about 1% by weight of toluene sulphonic acid, this substance forms an elastic insoluble plastic material over a period of about 20 minutes at about 130° C.

EXAMPLE 4

About 19 parts of trimethylol propane are dissolved in about 25 parts by volume of acetone, and the resulting solution is mixed with a solution of about 61 parts of N-isocyanato-methyl-N-methylcarbamic acid methyl ester in about 50 parts by volume of acetone. After the exothermic reaction has subsided, stirring is continued for about 5 minutes at about 45° C., after which the acetone is distilled off under reduced pressure. About 80 parts of a colorless, glass-like reaction product are obtained, of which 50% can be dissolved in ethylene glycol monomethyl ether acetate. The solution is heated for about 10 minutes at about 180° C. with 1% of phosphoric acid and a highly crosslinked hard plastic is obtained.

EXAMPLE 5

About 25 parts of 1,6-hexane diol are dissolved in about 25 parts by volume of acetone and, as in Example 4, the resulting solution is reacted with a solution of about 61 parts of N-methyl-N-methoxycarbonylaminomethyl isocyanate in about 50 parts by volume of acetone. Following removal of the acetone by distillation, about 86 parts of a colorless, crystalline reaction product, M.P. 83–85° C. are obtained.

EXAMPLE 6

About 19 parts of 1,4-butane diol are reacted, as in Example 4, with a solution of about 61 parts of N-methyl-N-methoxycarbonylaminomethyl isocyanate in about 50 parts by volume of acetone. Following removal of the acetone by distillation, about 80 parts of a colorless crystalline reaction product are obtained, M.P. 78–80° C.

EXAMPLE 7

About 19 parts of 1,3-butane diol are reacted as in Example 4 with a solution of about 61 parts of N-methyl-N-methoxycarbonylaminomethyl isocyanate in about 50 parts by volume of acetone. Following removal of the acetone by distillation, about 80 parts of colorless, viscous oil are obtained, of which 60% can be dissolved in butanol.

The solution is heated at about 125° C. with a catalytic quantity of p-toluene sulphonic acid chloride until the solvent is evaporated off. A thermoplastic, elastic resin insoluble in acetone is left behind.

EXAMPLE 8

About 123 parts of tetra-ethylene glycol are reacted at 50–60° C. with about 146 parts of N-methyl-N-methoxycarbonylaminomethyl isocyanate. The reaction product is a theoretical yield of a colorless low-viscosity oil. A 75% aqueous solution of this product is mixed with about 2% of hydrochloric acid and the resulting mixture is poured onto glass plates which are then heated for about 10 minutes at about 180° C. A clear plastics film insoluble both in water and in organic solvents is obtained.

EXAMPLE 9

About 70 parts of phthalic acid-di(6-hydroxyhexyl)-ester and about 54 parts of N-methyl-N-methoxycarbonyl-aminomethyl isocyanate are left to react with one another for about 4 hours at about 50° C. About 124 parts of a colorless, high-viscosity oil are obtained which gives an elastic, plastics material about 24 hours after a catalytic quantity of phosphorus trichloride has been added to it at room temperature.

EXAMPLE 10

About 130 parts of N-methyl-N-methoxycarbonyl-aminomethyl isocyanate are added dropwise at 50 to 60° C. to about 327 parts of a polyester of adipic acid, glycol and trimethylol propane with an OH number of 173 and an acid number of 4. The resulting mixture is then kept at the aforementioned temperature for a period of about 4 hours. A reaction product is obtained which is highly viscous at room temperature and can be stored for unlimited periods. If the reaction product is heated at about 120° C. in the presence of 0.1% by weight of p-toluene sulphonic acid, an insoluble elastic crosslinked plastic material is obtained.

EXAMPLE 11

The procedure is as in Example 10, except that a solution of about 140 parts of a polyester of phthalic acid, glycol and trimethylol propane containing 12% by weight of OH, in about 90 parts of ethylene glycol monoethyl ether acetate is used and the reaction is carried out with about 130 parts of N-methyl-N-methoxycarbonylamino-methyl isocyanate. A clear solution of a modified polyester which crosslinks spontaneously is obtained. When the solution is coated on to glass or metal and heated for about 30 minutes at 130° C., hard insoluble layers are obtained.

EXAMPLE 12

The procedure is as in Example 10, except that a solution of 140 parts of a polyesteramide of phthalic acid, trimethylol propane and ethanolamine with an OH number of 420 and an acid number of 0.8, in about 90 parts of ethylene glycol monoethyl ether acetate is used, and reacted with about 130 parts of N-methyl-N-methoxycarbonylaminomethyl isocyanate. A solution of a spontaneously crosslinking polyesteramide is obtained. It can nevertheless be stored in pure form at room temperature for unlimited periods. The addition of 2% of hydrochloric acid converts the substance into a crosslinked state over a period of 24 hours at 20° C. If such an acidified solution is poured on to wood, a hard, completely insoluble glossy layer is obtained.

EXAMPLE 13

About 63 parts of a relatively high molecular weight epoxide resin based on 2,2-bis-(p-hydroxyphenyl)-propane and epichlorohydrin with secondary hydroxyl groups and terminal epoxide groups (OH content=6.8%) are dissolved in about 33 parts of ethylene glycol monomethyl ether acetate and reacted over a period of about 6 hours at about 60° C. with about 36 parts of N-methyl-N-methoxycarbonylaminomethyl isocyanate. The solvent is then removed in vacuo. After a short period at about 130° C., a highly crosslinked transparent infusible plastic material is obtained, even in the absence of acids.

EXAMPLE 14

About 11.8 parts of N-methyl-N-methoxycarbonyl-aminomethyl isocyanate are added dropwise at 50 to 60° C. to about 200 parts by weight of a 48% benzene solution of a copolymer of styrene and methacrylic acid-β-hydroxypropyl ester containing 0.69% OH. The mixture is stirred for about 6 hours until the reaction is complete. A clear colorless solution is obtained which give a crosslinked insoluble polymer when catalytic quantities of phosphoric acid, p-toluene sulphonic acid or sulphuric acid are added to it.

EXAMPLE 15

About 205 parts of the polymer solution described in Example 5 are added dropwise to about 50° C. to about 16.3 parts of N-methyl-N-phenoxycarbonylaminomethyl isocyanate. About 0.1 part of stannous octoate is then added and the reaction is completed by heating for about 2 hours at 50 to 60° C. After it has been applied and dried, the polymer solution gives clear colorless films which are just soluble in organic solvents. When the films are treated with gaseous hydrogen chloride, they become hard and insoluble.

EXAMPLE 16

About 176 parts of a polyether of tetrahydrofuran with an average molecular weight of 2700 and an OH content of 1.275%, are fused at 50 to 60° C. About 23 parts of N-methyl-N-phenoxycarbonylaminomethyl isocyanate, are then stirred in and the mixture is heated for about 3 hours at 70 to 80° C. A product is obtained which is wax-like at room temperature and which can be converted into an insoluble crosslinked state by the addition of catalytic quanities of p-toluene sulphonic acid.

It is to be understood that any organic compound containing active hydrogen atoms and any of the isocyanates set forth above may be used throughout the above examples in equivalent quantities to the compound specifically set forth therein.

Although the invention has been described in considerable detail in the foregoing, it is to be understood that such detail is solely for the purpose of illustration and that many variations can be made by those skilled in art without departing from the spirit and scope of the invention except as set forth in the claims.

What is claimed is:

1. Crosslinkable polyaddition products which comprise the reaction product of an organic compound containing active hydrogen atoms which are reactive with NCO groups and a monoisocyanate having the formula

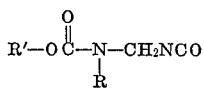

where R is a radical having 1 to 12 carbon atoms and selected from the group consisting of alkyl, alkenyl, cycloalkyl, aralkyl and chloraralkyl; R' is a radical selected from the group consisting of those set forth for R and in addition chloralkyl having 1 to 12 carbon atoms, aryl having 6 to 12 carbon atoms and chloraryl having 6 to 12 carbon atoms.

2. The product of claim 1 wherein the organic compound containing active hydrogen atoms is a polyhydric alcohol.

3. The product of claim 1 wherein the organic compound containing active hydrogen atoms is a polyamine.

4. The product of claim 1 wherein the organic compound containing active hydrogen atoms is a polyamide.

5. The product of claim 2 wherein the polyhydric alcohol has a molecular weight less than 600.

6. The product of claim 1 wherein the organic compound containing active hydrogen atoms has a molecular weight from about 600 to about 500,000.

7. A process for preparing crosslinkable polyaddition products in accordance with claim 1 which comprises reacting an organic isocyanate in accordance with claim 1 with an organic compound containing active hydrogen atoms which are reactive with NCO groups.

8. A method of preparing crosslinked plastics which comprises heating the reaction product of claim 1 to a temperature of 50 to 250° C.

9. A process for preparing crosslinked plastics which comprises allowing the product of claim 1 to react in the presence of an acid catalyst.

References Cited

UNITED STATES PATENTS

| | | | |
|---|---|---|---|
| 2,797,232 | 6/1957 | Buenge | 260—471 |
| 2,801,990 | 8/1957 | Seeger et al. | 260—75 |

OTHER REFERENCES

Saunders et al.: Polyurethanes Part I, Interscience, New York (1962), pp. 211—217.

DONALD E. CZAJA, Primary Examiner

H. S. COCKERAM, Assistant Examiner

U. S. Cl. X.R.

260—9, 18, 67, 75, 78, 858, 859, 37, 40